(12) United States Patent
Ahn et al.

(10) Patent No.: US 9,199,672 B1
(45) Date of Patent: Dec. 1, 2015

(54) LINK UNIT FOR FOLDABLE VEHICLE

(71) Applicant: HYUNDAI MOTOR COMPANY, Seoul (KR)

(72) Inventors: Gwang Hyun Ahn, Yongin-si (KR); Yong Woo Lee, Namyangju-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/558,360

(22) Filed: Dec. 2, 2014

(30) Foreign Application Priority Data

Jul. 9, 2014 (KR) .................. 10-2014-0085867

(51) Int. Cl.
*B62D 31/00* (2006.01)
*B62D 21/14* (2006.01)

(52) U.S. Cl.
CPC .............. *B62D 31/006* (2013.01); *B62D 21/14* (2013.01)

(58) Field of Classification Search
CPC ...... B62D 21/14; B62D 27/06; B62D 31/006; B62D 39/00
USPC .......... 296/26.02, 26.04, 26.05, 26.06, 26.07, 296/26.08, 26.09, 26.1, 26.11; 280/639
See application file for complete search history.

(56) References Cited

U.S. PATENT DOCUMENTS

| 3,850,472 A * | 11/1974 | Greppi ............... 296/26.11 |
| 4,089,542 A * | 5/1978 | Westerman ............ 280/639 |
| 2013/0240274 A1 | 9/2013 | Vitale et al. |
| 2014/0202780 A1 * | 7/2014 | Lark et al. .............. 180/65.1 |

FOREIGN PATENT DOCUMENTS

| JP | 2003-054441 A | | 2/2003 |
| JP | 2003054441 A | * | 2/2003 |
| JP | 3095111 U | | 4/2003 |
| JP | 2013-112096 A | | 6/2013 |
| KR | 10-2013-0092799 A | | 8/2013 |
| KR | 10-2014-0028725 A | | 3/2014 |
| KR | 10-2014-0029836 A | | 3/2014 |
| KR | 10-2014-0032385 A | | 3/2014 |
| KR | 10-1390874 B1 | | 4/2014 |

* cited by examiner

*Primary Examiner* — Jason S Daniels
(74) *Attorney, Agent, or Firm* — McDermott Will & Emery LLP

(57) ABSTRACT

A link unit for a foldable vehicle includes: a windshield part having a lower end hinge-coupled with a floor to rotate in a front and rear direction of a vehicle; a rear cabin part forming a dome-shaped cabin having a lower end hinge-coupled with the floor to rotate in the front and rear direction of the vehicle; a roof part having a rear end hinge-coupled with the rear cabin part and a front end provided with a slot in a longitudinal direction of the vehicle; a linear driver including a motor at an end of the slot, a ball screw extended along the slot, and a ball nut fastened with the ball screw to be slid along the slot; and a connection link having a front end hinge-coupled with an upper end of the windshield part and a rear end connected with the ball nut by a hinge pin.

7 Claims, 8 Drawing Sheets

LINK UNIT FOR FOLDABLE VEHICLE

CROSS REFERENCE TO RELATED APPLICATION

The present application claims priority to Korean Patent Application No. 10-2014-0085867, filed Jul. 9, 2014, the entire contents of which is hereby incorporated by reference herein for all purposes.

BACKGROUND OF THE DISCLOSURE

1. Technical Field

The present disclosure relates to a new concept link unit for a foldable vehicle capable of minimally occupying a space due to folding at the time of parking and forming a complete vehicle body at the time of unfolding.

2. Description of the Related Art

Recently, with the advent of an electric vehicle, and the like, one-man micro compact cars start to emerge as a concept car.

These vehicles are designed to be folded or unfolded to minimally occupy a parking space at the time of long-term parking.

However, in the case of the traditional folding vehicle, it is difficult to change a wheel base and therefore the wheel base occupies a lot of space even at the time of folding and a roof or a rear is not completely folded and therefore an overall length is not minimized even at the time of folding. In particular, even though the roof or the rear is folded, an overall height of a vehicle is rather increased at the time of folding and therefore it is difficult to park a vehicle in a parking space having a narrow height and the roof or rear protrudes upwards at the time of folding and therefore the appearance is very bad.

Therefore, a folding structure to maximally reduce the wheel base, completely fold the roof and the rear, and prevent the overall height from increasing is required.

The matters described as the related art have been provided only for assisting in the understanding for the background of the present disclosure and should not be considered as corresponding to the related art known to those skilled in the art.

SUMMARY OF THE DISCLOSURE

An object of the present disclosure is to provide a new concept link unit for a foldable vehicle capable of minimally occupying a space due to folding at the time of parking and forming a complete vehicle body at the time of unfolding.

According to an exemplary embodiment of the present disclosure, there is provided a link unit for a foldable vehicle, including: a windshield part configured to have a lower end hinge-coupled with a front portion of a floor to rotate in a front and rear direction of a vehicle; a rear cabin part configured to form a cabin in a dome shape and have a lower end hinge-coupled with the floor to rotate in the front and rear direction of the vehicle; a roof part configured to have a rear end hinge-coupled with the rear cabin part and a front end provided with a slot in a long hole form in a longitudinal direction of the vehicle; a linear driver configured to include a motor provided at an end of the slot, a ball screw extended along the slot, and a ball nut fastened with the ball screw to be slid along the slot; and a connection link configured to have a front end hinge-coupled with an upper end of the windshield part and a rear end connected with the ball nut of the linear driver by a hinge pin.

The lower end of the windshield part may be provided with a front driver so that the windshield part rotates in a front and rear direction and is folded or unfolded.

The motor of the linear driver may be disposed at a rear of the slot and the ball screw may be extended along the slot from the motor so that an end of the ball screw is fixed to a front of the slot.

The link unit for a foldable vehicle may further include: a controller configured to control the motor so that the ball nut moves to the motor side when the vehicle is unfolded and to control the motor so that the ball nut moves to an opposite side of the motor when the vehicle is folded.

The controller may control the motor to move the ball nut to an opposite side of the motor when the windshield part rotates toward the rear of the vehicle according to the folding operation, so that the connection link is maintained in a vertical direction and the roof part is supported by the connection link to maintain an interval from the windshield part.

The controller may control the motor to move the ball nut to the motor side when the roof part moves to the rear of the vehicle according to the unfolding operation so that the connection link is maintained in the vertical direction and the roof part is supported by the connection link to maintain the interval from the windshield part.

The ball nut of the linear driver may be positioned at the slot to be guided to the slot and slid along the slot.

Other detailed matters of the present disclosure are included in the detailed description and the accompanying drawings.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Hereinafter, exemplary embodiments of the present disclosure will be described with reference to the accompanying drawings.

Figure 5:
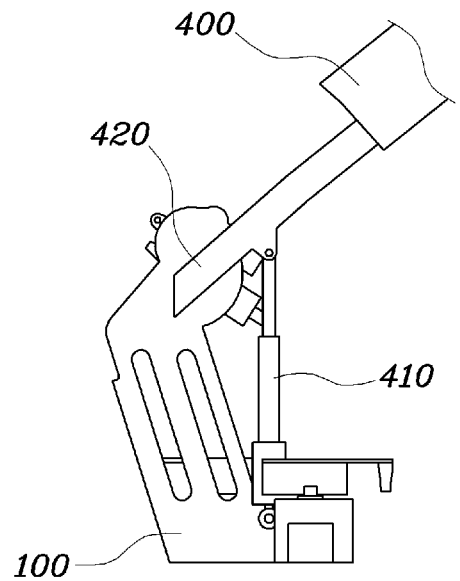
FIG. 5 is a view illustrating an operation structure of a windshield part of the foldable vehicle according to the exemplary embodiment of the present disclosure.
Figure 6:
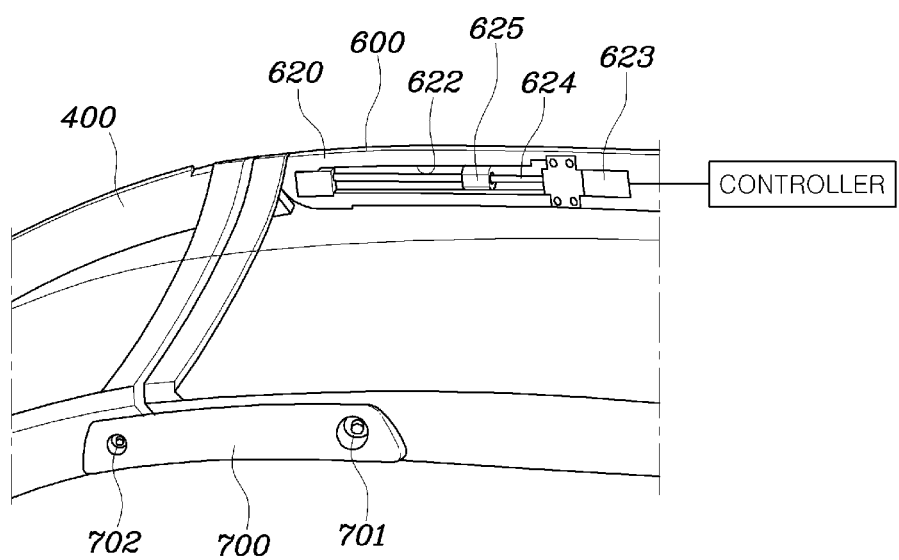
FIG. 6 is a view illustrating a link unit for a foldable vehicle according to an exemplary embodiment of the present disclosure.

FIGS. 1 to 4 are views illustrating the overall operation process of a foldable vehicle according to an exemplary embodiment of the present disclosure. FIG. 5 is a view illustrating an operation structure of a windshield part of the foldable vehicle according to the exemplary embodiment of the present disclosure. FIG. 6 is a view illustrating a link unit for a foldable vehicle according to an exemplary embodiment of the present disclosure. FIGS. 7 to 12 are views illustrating an operation process of the link unit for a foldable vehicle according to an exemplary embodiment of the present disclosure.

First, a vehicle to which the present disclosure is applied will be generally described with reference to FIGS. 1 to 5.

The foldable vehicle according to the exemplary embodiment of the present disclosure includes: a floor part F configured to include a front floor 100 provided with a front wheel 110 and a rear floor 200 provided with a rear wheel 210, in which the front floor 100 and the rear floor 200 overlap each other or are extended by being slid to each other to extend or contract a wheel base of a vehicle; a windshield part 400 configured to include a windshield glass 401 and have a lower end 420 hinge-coupled with a front portion of the front floor 100 to rotate in a front and rear direction of the vehicle; a rear cabin part 500 configured to be positioned at a rear of the vehicle in a dome shape to form a cabin and have a lower end hinge-coupled with the floor part F to rotate in the front and rear direction of the vehicle; and a roof part 600 configured to have a link structure in which a front end of the roof part 600 is hinge-coupled with an upper end of the windshield part 400 and a rear end of the roof part 600 is hinge-coupled with an upper end of the rear cabin part 500 and when the windshield part 400 and the rear cabin part 500 are folded into the vehicle, be positioned inside the vehicle and when the windshield part 400 and the rear cabin part 500 are unfolded to an outside of the vehicle, be exposed to the outside to configure a roof of the vehicle.

The floor part F is configured of the front floor 100 provided with the front wheel 110 and the rear floor 200 provided with the rear wheel 210. The front floor 100 and the rear floor 200 overlap each other or are extended by being slid to each other to extend or contract the wheel base of the vehicle.

Further, the front floor 100 is provided with the windshield glass 401 like a general vehicle. The windshield glass 401 is mounted on the windshield part 400 and the windshield part 400 has the lower end hinge-coupled with the front portion of the front floor 100 to rotate in the front and rear direction of the vehicle. Therefore, the vehicle may be driven by folding the windshield backward when the vehicle is folded and unfolding the windshield forward when the vehicle is unfolded.

Further, the rear cabin part 500 is positioned at the rear of the vehicle in a dome shape to form a cabin and has the lower end hinge-coupled with the floor part F of the front floor 100 or the rear floor 200 to rotate in the front and rear directions of the vehicle. The following exemplary embodiment describes a state in which the rear cabin part 500 is coupled with the rear portion of the front floor 100.

Further, the roof part 600 having the link structure in which the front end of the roof part 600 is hinge-coupled with the upper end of the windshield part 400 and the rear end thereof is hinge-coupled with the upper end of the rear cabin part 500 is provided. The roof part 600 is folded together with the windshield part 400 when the windshield part 400 is folded and is directed to an inner space of the rear cabin part 500. Further, when the rear cabin part 500 is folded into the vehicle, the windshield part 400 and the roof part 600 both are positioned in the vehicle, that is, the inner space of the rear cabin part 500. When the windshield part 400 and the rear cabin part 500 are unfolded to the outside of the vehicle, the roof part 600 is also exposed to the outside to configure the roof of the vehicle.

Therefore, in the foldable vehicle according to the exemplary embodiment of the present disclosure, the wheel base is extended and contracted and the windshield and the roof are inserted into the cabin when the wheel base is contracted and the cabin rotates to cover the vehicle to be able to reduce a space in a horizontal direction and a space in a vertical direction.

Figure 1:
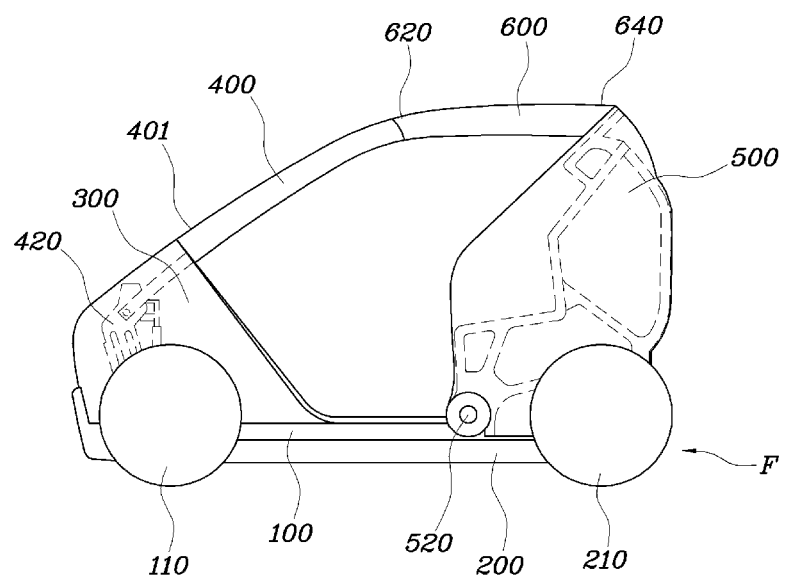
FIGS. 1 to 4 are views illustrating the overall operation process of a foldable vehicle according to an exemplary embodiment of the present disclosure.
Figure 2:
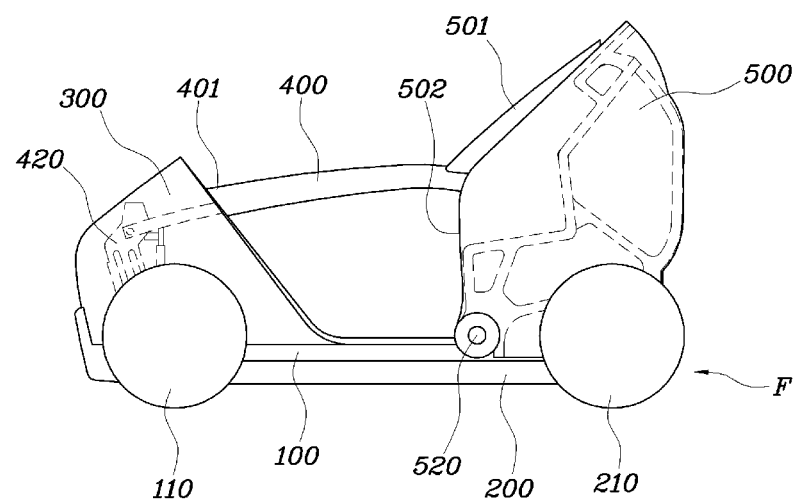

FIGS. 1 to 4 further illustrate a process of folding the vehicle. First, as illustrated in FIG. 2, the windshield part 400 is folded and thus the roof part 600 is sunk into the vehicle. Here, when the windshield part 400 is folded, the windshield part 400 and the roof part 600 are bent to form an acute angle and thus may be folded so that a vertex at which the windshield part 400 meets the roof part 600 directs to the rear cabin part 500.

Figure 3:
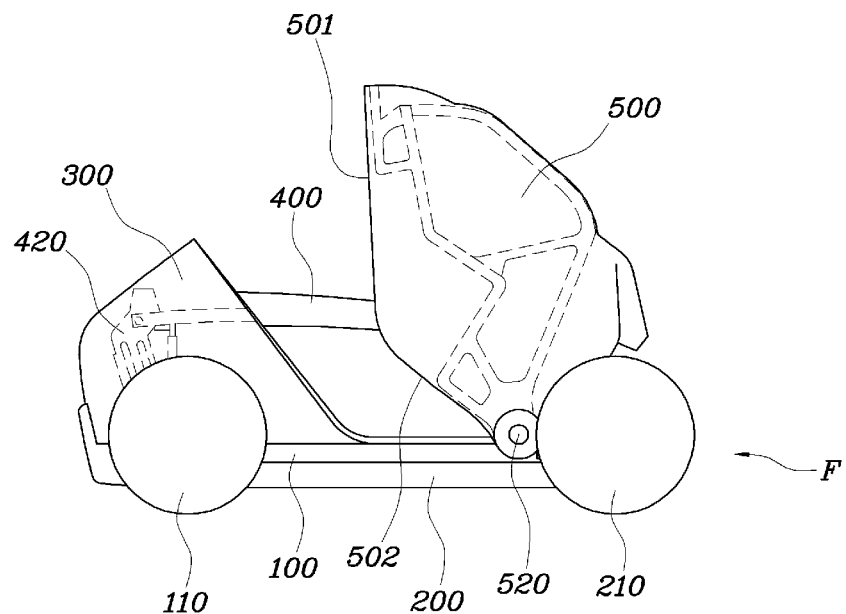

Next, as illustrated in FIG. 3, the rear cabin part 500 rotates forward and covers the windshield part 400 and the roof part 600 together, and at the same time, the rear floor 200 is slid forward by driving the rear wheel 210 and overlaps the front floor 100 to contract the wheel base. Here, a rear driver 520 rotates the rear cabin part 500 in the front and rear direction of the vehicle. Further, the rear wheel driver drives the rear wheel 210 when the vehicle is folded to slide the rear floor 200 to the front floor 100 so as to contract the wheel base.

Figure 4:
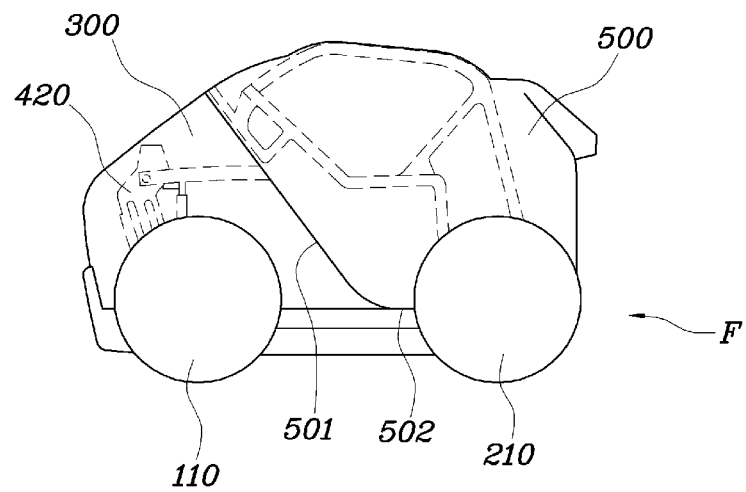

Finally, the folding is completed in the form as illustrated in FIG. 4 to reduce the space in the horizontal direction and the vertical direction. At the time of unfolding, the process is performed reversely to unfold the vehicle.

Meanwhile, as illustrated in FIG. 5, a front driver 410 rotates the windshield part 400 in the front and rear direction of the vehicle. In detail, the front driver 410 may be a linear actuator which has a lower end coupled with the front floor 100 and an upper end coupled with the windshield part 400 to push or pull the windshield part 400 so as to rotate the windshield part 400.

That is, the front driver 410 rotating the windshield part 400 in the front and rear direction of the vehicle, the rear driver 520 rotating the rear cabin part 500 in the front and rear direction of the vehicle, and the rear wheel driver driving the rear wheel 210 when the vehicle is folded to slide the rear floor 200 to the front floor 100 to contract the wheel base are provided and the front driver 410 is first driven when the vehicle is folded to bend the windshield part 400 and the roof part 600 into the vehicle and then drive the rear driver 520 and the rear wheel driver to perform the folding. Further, the windshield part 400 and the roof part 600 may be received into the cabin space inside the rear cabin part 500 at the time of the driving of the rear driver 520.

Meanwhile, the rear driver 520 and the rear wheel driver are driven together to contract the wheel base and the windshield part 400 and the roof part 600 may be completely received into the rear cabin part 500. Thereby, folding time may be shortened. Finally, the rear cabin part 500 contacts a rear end of a hood 300 of the vehicle at the time of folding to be able to completely cover the vehicle.

Further, the rear cabin part 500 may be configured of a shielding surface covering the cabin, a first adhering part 501 which adheres to the rear end of the hood 300 of the vehicle at the time of folding, and a second adhering part 502 which adheres to the floor part F of the vehicle at the time of folding. Thereby, it is possible to prevent the interior of the vehicle from being polluted due to external factors and to protect the vehicle from a theft, and the like in the state in which the folding is completed as illustrated in FIG. 4.

Further, when the vehicle is folded and then unfolded, to the contrary, the rear driver and the rear wheel driver are first driven to rotate the rear cabin part 500 backward while extending the wheel base and drive the front driver 410 to unfold the windshield part 400 and the roof part 600 to the outside.

FIG. 6 is a view illustrating a link unit for a foldable vehicle according to an exemplary embodiment of the present disclosure and FIGS. 7 to 12 are views illustrating an operation process of the link unit for a foldable vehicle according to an exemplary embodiment of the present disclosure.

The link unit for a foldable vehicle according to the exemplary embodiment of the present disclosure includes: a windshield part 400 configured to have a lower end hinge-coupled with a front portion of the floor to rotate in a front and rear direction of the vehicle; a rear cabin part 500 configured to form a cabin in a dome shape and have a lower end hinge-coupled with the floor to rotate in the front and rear direction of the vehicle; a roof part 600 configured to have a rear end hinge-coupled with the rear cabin part 500 and a front end provided with a slot 622 in a long hole form in the longitudinal direction of the vehicle; a linear driver configured to include a motor 623 provided at an end of the slot 622, a ball screw 624 extending along the slot 622, and a ball nut 625 fastened with the ball screw 624 to be slid along the slot 622; and a connection link 700 configured to have a front end hinge-coupled 702 with the upper end of the windshield part 400 and a rear end connected with the ball nut 625 of the linear driver by a hinge pin 701.

In detail, the windshield part 400 has a lower end hinge-coupled with the front portion of the floor to rotate in the front and rear direction of the vehicle. Further, the rear cabin part 500 forms the cabin in the dome shape and has a lower end hinge-coupled with the floor to rotate in the front and rear direction of the vehicle.

In particular, the roof part 600 has the rear end hinge-coupled with the rear cabin part 500 and the front portion provided with the slot 622 in the long hole form in the longitudinal direction of the vehicle. Further, the end of the slot 622 is provided with the motor 623 and the ball screw 624 is extended along the slot 622. Further, the ball nut 625 fastened with the ball screw 624 is slid along the slot 622 and the ball nut 625 and the ball screw 624 configure the linear driver together.

Meanwhile, the connection link 700 has the front end hinge-coupled with the upper end of the windshield part 400 and the rear end connected to the ball nut 625 of the linear driver by the hinge pin 701.

In detail, the motor 623 of the linear driver is disposed at a rear of the slot 622 and the ball screw 624 is extended along the slot 622 from the motor 623 so that an end of the ball screw 624 is fixed to a front of the slot 622. The motor 623 is a general rotary motor and at the time of the rotation of the motor, the ball screw 624 rotates and thus the ball nut 625 has an inner circumferential surface bolted with an outer circumferential surface of the ball screw 624, such that the ball nut 625 is prohibited from rotating on the slot 622 and is only advanced or retreated. That is, the ball nut 625 of the linear driver is positioned at the slot 622 to be guided to the slot 622 and slid along the slot 622.

In detail, a controller controls the motor 623 so that the ball nut 625 moves to the motor 623 side when the vehicle is unfolded and controls the motor 623 so that the ball nut 625 moves to an opposite side of the motor 623 when the vehicle is folded.

The controller controls the motor 623 to move the ball nut 625 to the opposite side of the motor 623 when the windshield part 400 rotates toward the rear of the vehicle according to the folding operation, so that the connection link 700 may be maintained in a vertical direction and the roof part 600 may be supported by the connection link 700 to maintain an interval from the windshield part 400.

Further, the controller controls the motor 623 to move the ball nut 625 to the motor 623 side when the roof part 600 moves to the rear of the vehicle according to the unfolding operation so that the connection link 700 may be maintained in the vertical direction and the roof part 600 may be supported by the connection link 700 to maintain the interval from the windshield part 400.

Figure 7:
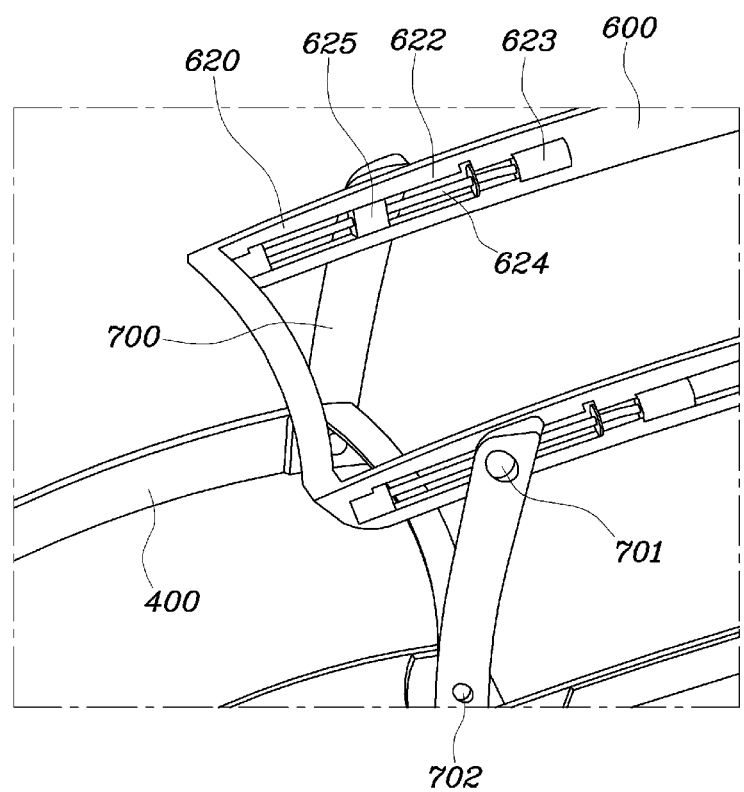
FIGS. 7 to 12 are views illustrating an operation process of the link unit for a foldable vehicle according to an exemplary embodiment of the present disclosure.
Figure 8:
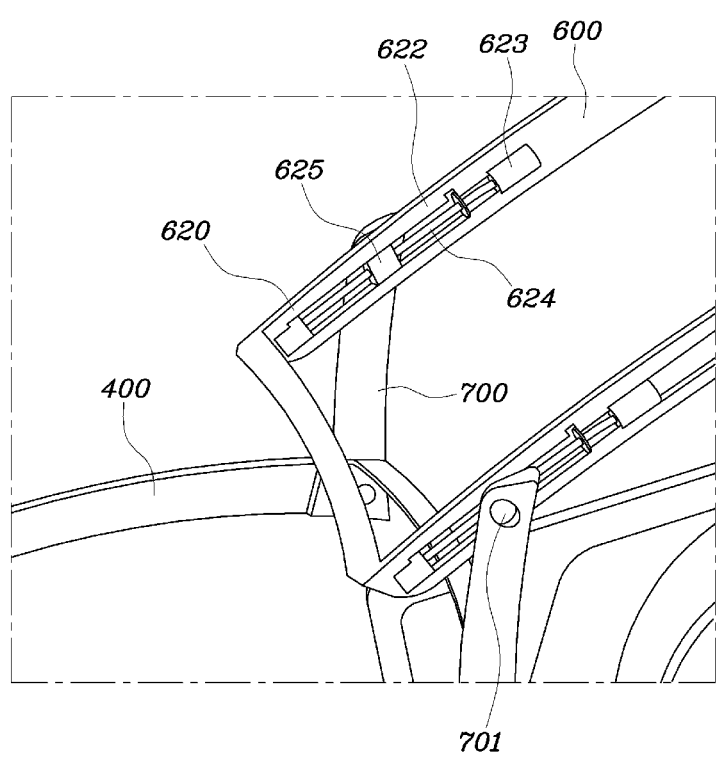
Figure 9:
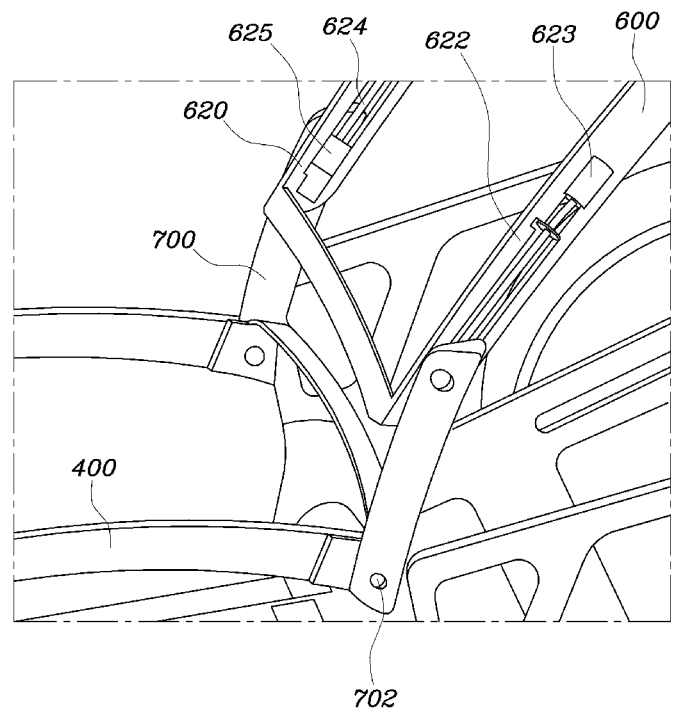

FIGS. 7 to 9 illustrate the folding operation. At the time of the folding, the rear cabin part 500 rotates forward in the state in which the windshield part 400 rotates backward. In this case, the controller drives the motor 623 to push the ball nut 625 forward, such that the connection link 700 is vertically erected as illustrated. When the connection link 700 is not erected, the roof part 600 contacts the windshield part 400 while being sunk into the vehicle to make it difficult to perform the folding.

Figure 10:
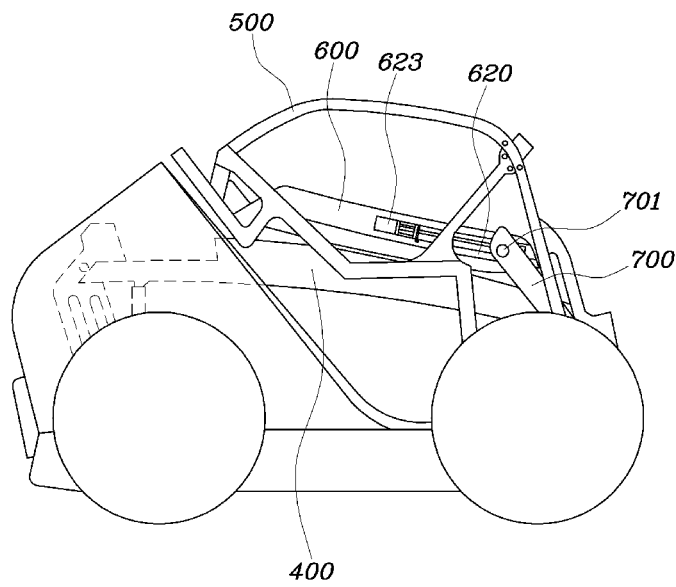
Figure 11:
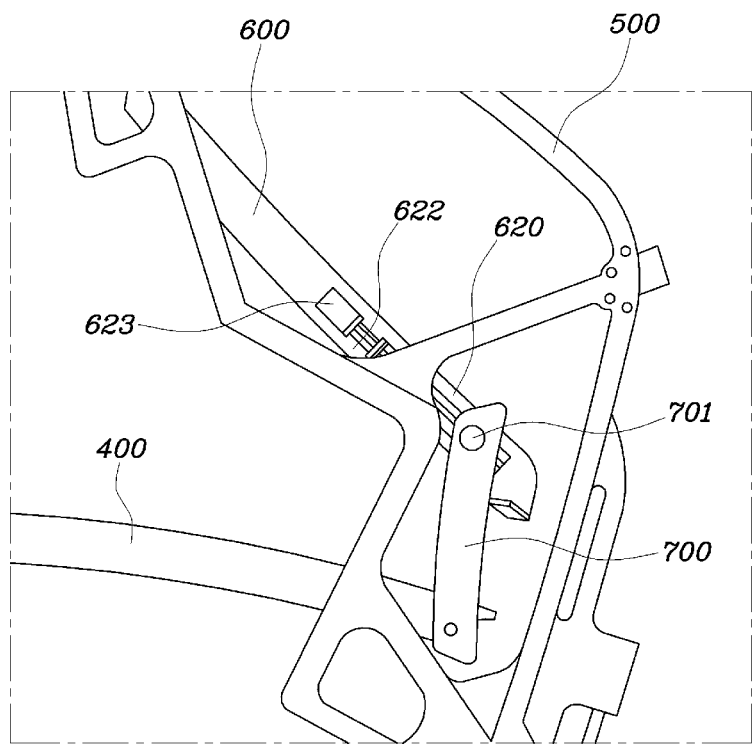
Figure 12:
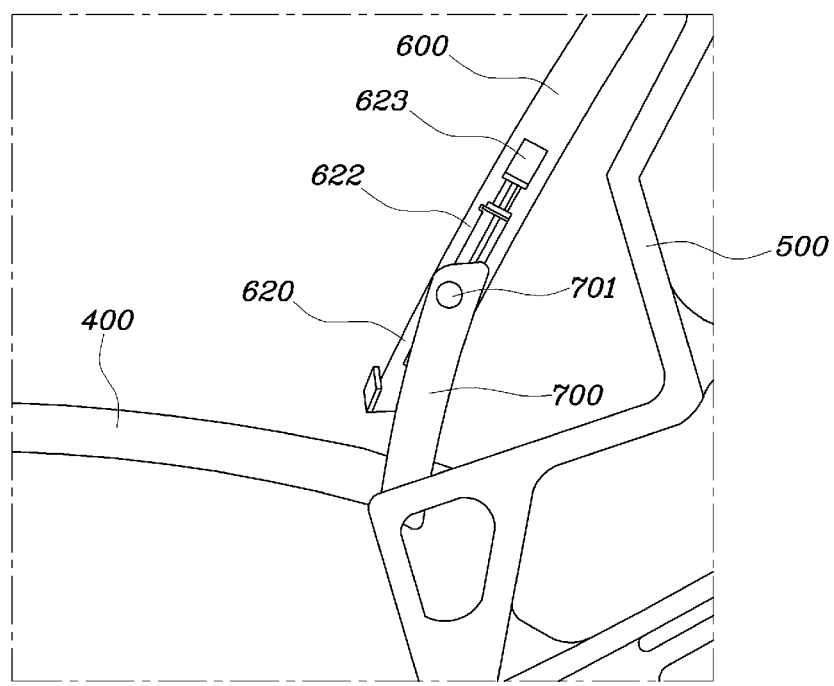

Meanwhile, FIGS. 10 to 12 illustrate the unfolding operation and even at the time of the unfolding, similarly, the controller pulls the ball nut 625 when the rear cabin part 500 rotates backward. Therefore, the connection link 700 may be erected without being sunk and therefore the roof part 600 also maintains a rising state to some extent, and as a result, the roof part 600 maintains a predetermined distance from the windshield part 400 to prevent a collision therebetween.

By the configuration, the interference between the cabin and the roof is prevented when the cabin and the roof are folded and unfolded.

As described above, according to the link unit for a foldable vehicle according to the exemplary embodiment of the present disclosure, it is possible to exhibit an optimal effect in the downtown area by parking a maximum of four vehicles in a parking space in which one vehicle may be parked at the time of parking.

Further, it is possible to facilitate driving by reducing the wheel base and thus reducing the rotating radius, by achieving the local folding in a narrow space.

Further, it is possible to sufficiently park a vehicle even at the area where the height of the roof is low by lowering the overall height at the time of parking.

In particular, it is possible to prevent the cabin and the roof from interfering with each other at the time of folding.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A link unit for a foldable vehicle, comprising:
    a windshield part configured to have a lower end hinge-coupled with a front portion of a floor to rotate in a front and rear direction of a vehicle;
    a rear cabin part configured to form a cabin in a dome shape and have a lower end hinge-coupled with the floor to rotate in the front and rear direction of the vehicle;
    a roof part configured to have a rear end hinge-coupled with the rear cabin part and a front end provided with a slot in a long hole form in a longitudinal direction of the vehicle;
    a linear driver configured to include a motor provided at an end of the slot, a ball screw extended along the slot, and a ball nut fastened with the ball screw to be slid along the slot; and
    a connection link configured to have a front end hinge-coupled with an upper end of the windshield part and a rear end connected with the ball nut of the linear driver by a hinge pin.

2. The link unit for a foldable vehicle of claim 1, wherein the lower end of the windshield part is provided with a front driver so that the windshield part rotates in the front and rear direction and is folded or unfolded.

3. The link unit for a foldable vehicle of claim 1, wherein the motor of the linear driver is disposed at a rear of the slot and the ball screw is extended along the slot from the motor so that an end of the ball screw is fixed to a front of the slot.

4. The link unit for a foldable vehicle of claim 1, further comprising:
 a controller configured to control the motor so that the ball nut moves to a motor side when the vehicle is unfolded and control the motor so that the ball nut moves to an opposite side of the motor when the vehicle is folded.

5. The link unit for a foldable vehicle of claim 4, wherein the controller controls the motor to move the ball nut to the opposite side of the motor when the windshield part rotates toward a rear of the vehicle according to the folding operation, so that the connection link is maintained in a vertical direction and the roof part is supported by the connection link to maintain an interval from the windshield part.

6. The link unit for a foldable vehicle of claim 4, wherein the controller controls the motor to move the ball nut to the motor side when the roof part moves to a rear of the vehicle according to the unfolding operation so that the connection link is maintained in a vertical direction and the roof part is supported by the connection link to maintain an interval from the windshield part.

7. The link unit for a foldable vehicle of claim 1, wherein the ball nut of the linear driver is positioned at the slot to be guided to the slot and slid along the slot.

* * * * *